(12) United States Patent
Suzuki et al.

(10) Patent No.: US 10,989,285 B2
(45) Date of Patent: Apr. 27, 2021

(54) SCREW DEVICE

(71) Applicant: THK CO., LTD., Tokyo (JP)

(72) Inventors: Atsushi Suzuki, Tokyo (JP); Kotaro Kawai, Tokyo (JP)

(73) Assignee: THK CO., LTD., Tokyo (JP)

( * ) Notice: Subject to any disclaimer, the term of this patent is extended or adjusted under 35 U.S.C. 154(b) by 32 days.

(21) Appl. No.: 16/488,378

(22) PCT Filed: Feb. 5, 2018

(86) PCT No.: PCT/JP2018/003773
§ 371 (c)(1),
(2) Date: Aug. 23, 2019

(87) PCT Pub. No.: WO2018/155146
PCT Pub. Date: Aug. 30, 2018

(65) Prior Publication Data
US 2020/0240496 A1     Jul. 30, 2020

(30) Foreign Application Priority Data
Feb. 23, 2017    (JP) .............................. JP2017-031781

(51) Int. Cl.
*F16H 25/24*     (2006.01)
*F16H 25/22*     (2006.01)
*F16C 33/37*     (2006.01)

(52) U.S. Cl.
CPC ......... *F16H 25/2223* (2013.01); *F16H 25/24* (2013.01); *F16C 33/3706* (2013.01);
(Continued)

(58) Field of Classification Search
CPC .. F16H 25/2223; F16H 25/24; F16H 25/2219; F16H 2025/2242; F16H 2025/2481; F16C 33/3706
(Continued)

(56) References Cited

U.S. PATENT DOCUMENTS

| 2005/0183530 A1 | 8/2005 | Kato |
| 2009/0084212 A1 | 4/2009 | Niwa et al. |

(Continued)

FOREIGN PATENT DOCUMENTS

| CN | 101432550 A | 5/2009 |
| CN | 202674209 U | 1/2013 |

(Continued)

OTHER PUBLICATIONS

Office Action issued in Chinese Patent Application No. 201880013403 dated Dec. 11, 2019 with English translation provided.
(Continued)

*Primary Examiner* — Randell J Krug
(74) *Attorney, Agent, or Firm* — Nixon & Vanderhye

(57) ABSTRACT

A screw device is provided which can facilitate management of a tolerance of a recess where a circulation component is housed. A circulation component is housed in a recess of a nut with clearance. At least part of the circulation component is blocked by a lid member fixed to the nut by fastening means. Upon a centrifugal force acting on a rolling element moving along a circulation path in the circulation component, the circulation component comes into contact at three points with the recess as viewed in an axial direction.

16 Claims, 16 Drawing Sheets

(52) U.S. Cl.
CPC .. *F16H 25/2219* (2013.01); *F16H 2025/2242* (2013.01); *F16H 2025/2481* (2013.01)

(58) Field of Classification Search
USPC ...................................................... 74/424.87
See application file for complete search history.

(56) References Cited

U.S. PATENT DOCUMENTS

| | | | |
|---|---|---|---|
| 2010/0180707 A1* | 7/2010 | Wu | F16C 29/0611 |
| | | | 74/424.87 |
| 2010/0236345 A1 | 9/2010 | Miyahara et al. | |
| 2016/0091066 A1 | 3/2016 | Suzuki | |
| 2017/0370454 A1 | 12/2017 | Nakamura et al. | |

FOREIGN PATENT DOCUMENTS

| | | | | |
|---|---|---|---|---|
| CN | 103511576 | A | 1/2014 | |
| CN | 204610733 | U | 9/2015 | |
| CN | 105247245 | A | 1/2016 | |
| DE | 102014224713 | A1 | 6/2016 | |
| JP | 2006-226314 | A | 8/2006 | |
| JP | 2008-008456 | A | 1/2008 | |
| JP | 2014-16039 | A | 1/2014 | |
| JP | 2015-137661 | A | 7/2015 | |
| JP | 2016-98905 | A | 5/2016 | |
| JP | 2016-145642 | A | 8/2016 | |
| JP | 2016145642 | A * | 8/2016 | ......... F16H 25/2219 |
| JP | 2016-169819 | A | 9/2016 | |
| WO | 2009/057424 | A1 | 5/2009 | |

OTHER PUBLICATIONS

International Search Report, dated Mar. 27, 2018, from corresponding PCT application No. PCT/JP2018/003773.

Office Action issued in German Patent Application No. 11 2018 000 964.5 dated Apr. 14, 2020 with English translation provided.

* cited by examiner

SCREW DEVICE

TECHNICAL FIELD

The present invention relates to a screw device where rolling elements such as balls are disposed between a screw shaft and a nut in such a manner as to be capable of rolling motion.

BACKGROUND ART

A screw device includes a screw shaft, a nut, and a plurality of rolling elements disposed between the screw shaft and the nut. When the screw shaft rotates relatively to the nut, the rolling elements perform rolling motion between them, and the nut moves in an axial direction. The screw device has a feature that the light movement of the nut can be obtained by using the rolling motion of the rolling elements and is widely used as a mechanical element.

In order to circulate rolling elements in a known screw device, a return path in the axial direction is formed in a nut and a recess is formed in an end surface or outer peripheral surface of the nut. A circulation component is fitted into the recess. A circulation path connecting a groove of the nut and the return path of the nut is formed in the circulation component. The rolling element that has rolled to one end of the groove of the nut is scooped into the circulation path of the circulation component, and returns to the other end of the groove of the nut via the return path and a circulation path of the other circulation component (refer to Patent Literature 1).

In order to connect the circulation path of the circulation component and the groove and the return path of the nut without a level difference in the known screw device, the circulation component is fitted into the recess of the nut within a predetermined tolerance. The circulation component is then fixed to the nut using a screw.

CITATION LIST

Patent Literature

Patent Literature 1: JP 2008-8456 A

SUMMARY OF INVENTION

Technical Problem

However, in the known screw device, the circulation component is fitted into the recess of the nut within the predetermined tolerance. Accordingly, the area of the contact portion of the circulation component and the recess is increased. There is a problem that it is necessary to manage a tolerance of the large contact portion, and the management of the tolerance is difficult.

Hence, an object of the present invention is to provide a screw device that can facilitate the management of a tolerance of a recess where a circulation component is housed.

Solution to Problem

In order to solve the above problem, the present invention is a screw device including: a screw shaft having a helical rolling element rolling groove; a nut having a helical rolling element rolling groove opposing the rolling element rolling groove of the screw shaft, and a return path in an axial direction; and a circulation component having a circulation path connecting the rolling element rolling groove of the nut and the return path of the nut, in which the circulation component is housed in a recess of the nut with clearance, at least part of the circulation component is covered by a lid member fixed to the nut by fastening means, and upon a centrifugal force acting on a rolling element moving along the circulation path, the circulation component comes into contact at at least three points with the recess, or the recess and the lid member, as viewed in the axial direction or as viewed in an insertion direction of the circulation component.

Advantageous Effects of Invention

According to the present invention, the circulation component is housed in the recess of the nut with clearance. Accordingly, it is easy to house the circulation component in the recess. Moreover, the centrifugal force that acts on the rolling element when the rolling element circulates is used to bring the circulation component into contact at at least three points with the recess of the nut. Accordingly, even if the circulation component is not fixed to the nut by fastening means, the position of the circulation component can be fixed. Therefore, the rolling element circulates smoothly. Furthermore, it is simply required to manage a tolerance of at least three points of the recess where the circulation component comes into contact. Accordingly, it is also easy to manage the tolerance.

DESCRIPTION OF EMBODIMENTS

A screw device of embodiments of the present invention is described in detail hereinafter with reference to the accompanying drawings. However, the screw device of the present invention can be embodied in various modes, and is not limited to the embodiments described in the description. The embodiments are provided with the intention of enabling those skilled in the art to fully understand the scope of the invention by fully disclosing the description.

First Embodiment

Figure 1:
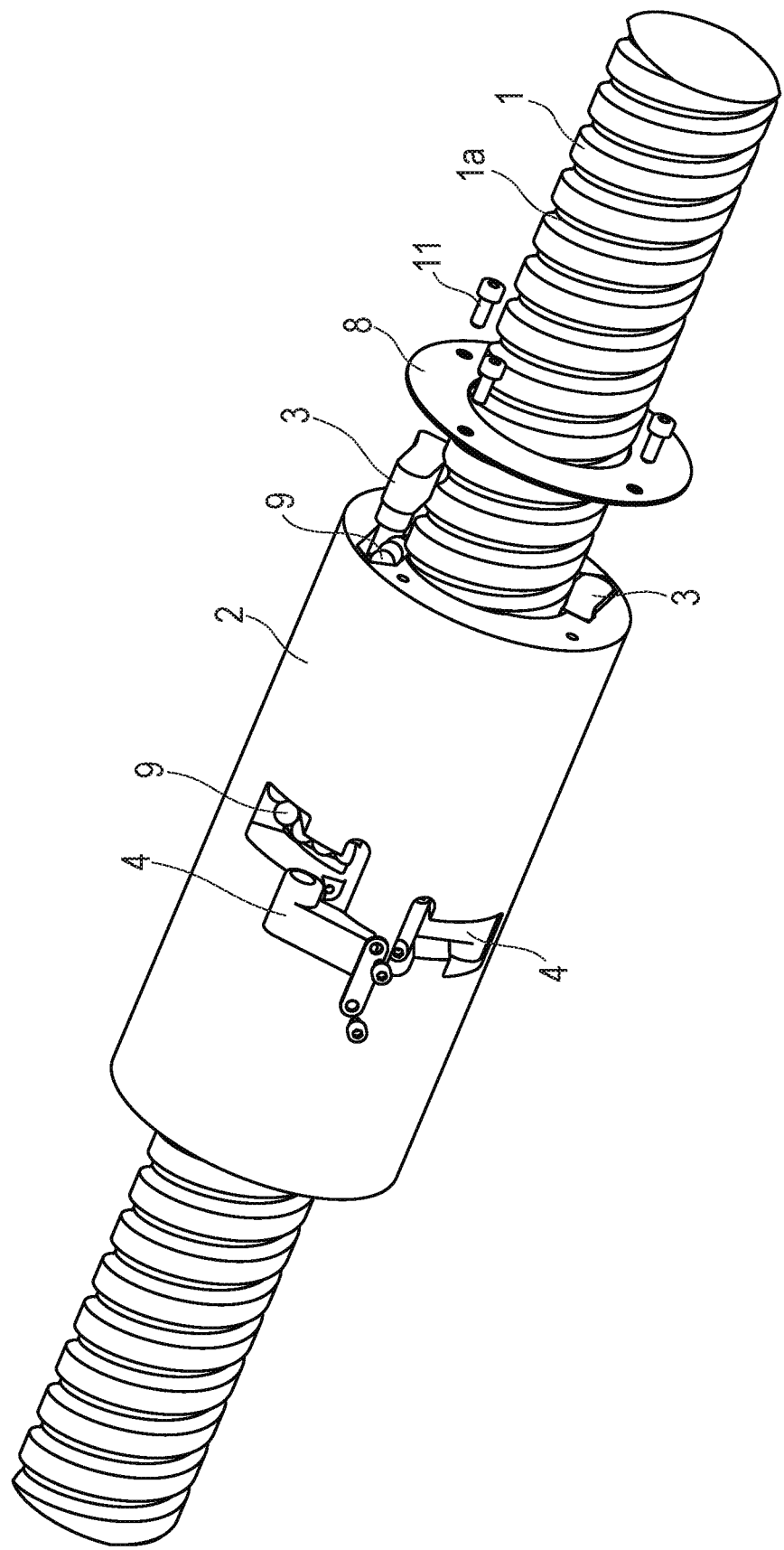
FIG. 1 is an exploded perspective view of a screw device of a first embodiment of the present invention.
Figure 2:
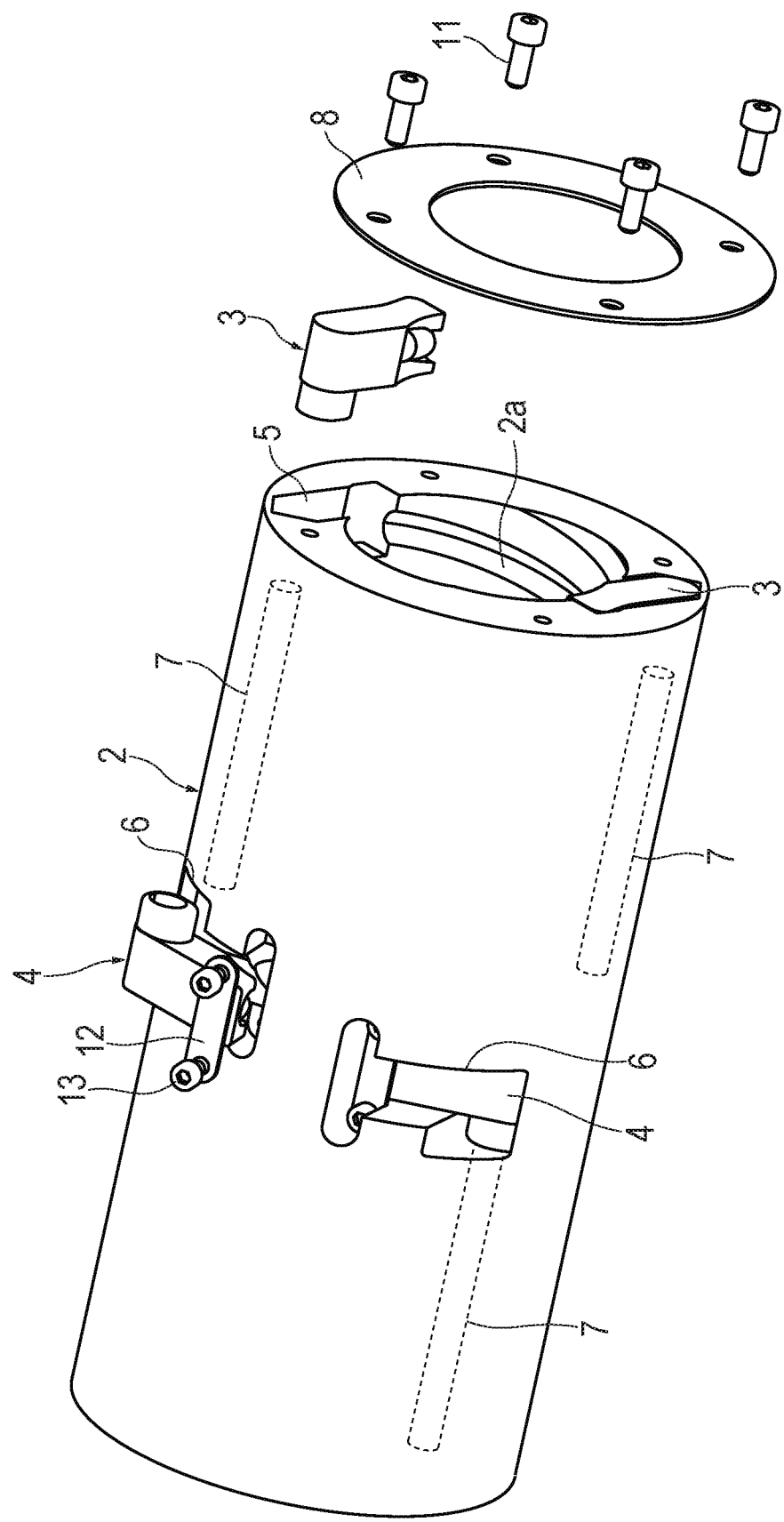
FIG. 2 is an exploded perspective view of a nut of the embodiment.

FIG. 1 illustrates an exploded perspective view of a screw device of a first embodiment of the present invention. FIG. 2 illustrates an exploded perspective view of a nut 2. The screw device of the embodiment includes a screw shaft 1, the nut 2, and a plurality of balls 9 disposed between the screw shaft 1 and the nut 2 in such a manner as to be capable of rolling motion. The screw device is a ball screw.

A helical ball rolling groove 1a is formed as a rolling element rolling groove on an outer peripheral surface of the screw shaft 1. The ball rolling groove 1a is a Gothic arch groove or circular arc groove. The number of the ball rolling grooves 1a of the embodiment is two, but can be variously set, such as one and three.

As illustrated in FIG. 2, the nut 2 is cylindrical. A helical ball rolling groove 2a is formed as a rolling element rolling groove on an inner peripheral surface of the nut 2. The ball rolling groove 2a of the nut 2 opposes the ball rolling groove 1a of the screw shaft 1. The ball rolling groove 2a is a Gothic arch groove or circular arc groove. The number of the ball rolling grooves 2a of the embodiment is two, but can be variously set, such as one and three.

The nut 2 is provided with two circulation paths in the axial direction per the ball rolling groove 2a. It has a double start thread; accordingly, four circulation paths in total are provided. Each circulation path includes an end circulation component 3 and a middle circulation component 4 as the circulation components. The end circulation component 3 is housed in an end recess 5 formed in an end surface of the nut 2. The middle circulation component 4 is housed in a middle recess 6 formed in an outer peripheral surface of the nut 2. The number of the circulation paths is not limited to four, and is simply required to be one or more.

A return path 7 including a through-hole extending in the axial direction is formed in the nut 2. The return path 7 is connected to the end recess 5 and the middle recess 6. A circulation path connecting one end of the return path 7 and one end of the ball rolling groove 2a is formed in the end circulation component 3. A circulation path connecting the other end of the return path 7 and the other end of the ball rolling groove 2a is formed in the middle circulation component 4.

The ball 9 that has rolled to the one end of the ball rolling groove 2a of the nut 2 is scooped into the end circulation component 3, and returns to the other end of the ball rolling groove 2a via the return path 7 and the middle circulation component 4. The ball 9 that has rolled to the other end of the ball rolling groove 2a of the nut 2 is scooped into the middle circulation component 4, and returns to the one end of the ball rolling groove 2a via the return path 7 and the end circulation component 3.

Figure 3:
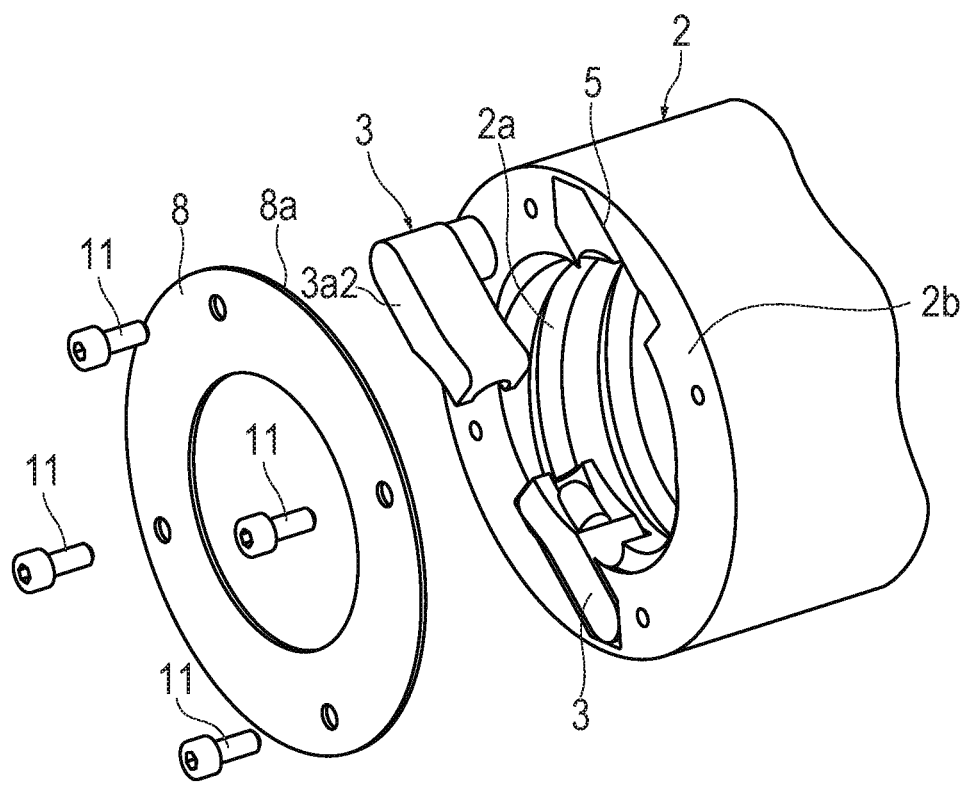
FIG. 3 is an exploded perspective view of an end portion of the nut of the embodiment.
Figure 3:
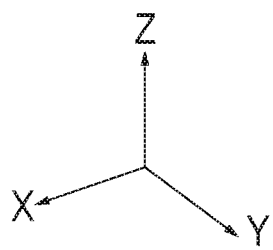

The end circulation component 3 and the middle circulation component 4 are described in detail below. In the following description, for convenience of description, directions of when the axial direction of the nut 2 is oriented in an X direction, that is, X, Y, and Z directions in FIG. 3 are used to describe the configuration of the screw device.

The end recess 5 is formed in the end surface of the nut 2 in the X direction. As illustrated in FIG. 3, the front shape of the end recess 5 is a polygon that matches the front shape of the end circulation component 3. The end recess 5 communicates with the ball rolling groove 2a and the return path 7.

Figure 4A:
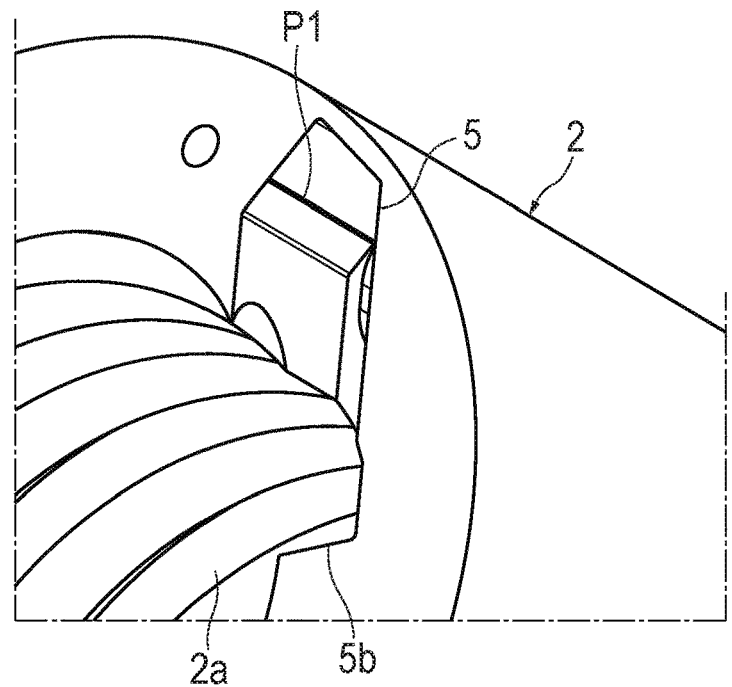
FIGS. 4A and 4B are perspective views of an end recess as viewed from different angles.
Figure 4B:
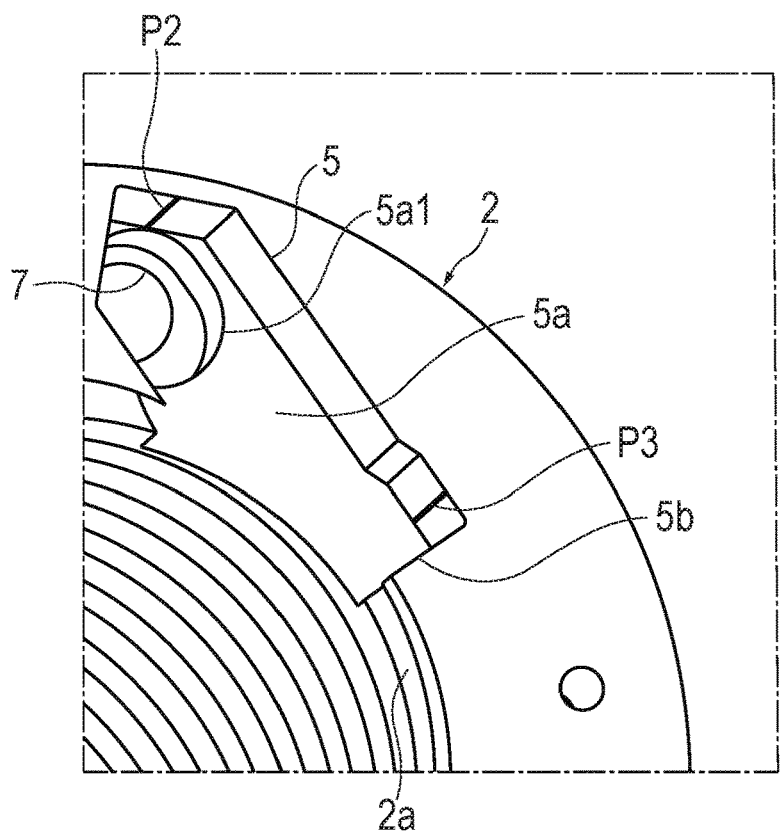

FIGS. 4A and 4B illustrate perspective views of the end recess 5 as viewed from different angles. An elliptic recess 5a1 is formed, recessed down one stage from a bottom surface 5a of the end recess 5. The elliptic recess 5a1 is connected to the return path 7. A wall surface 5b of the end recess 5 is connected to the ball rolling groove 2a.

Figure 5A:
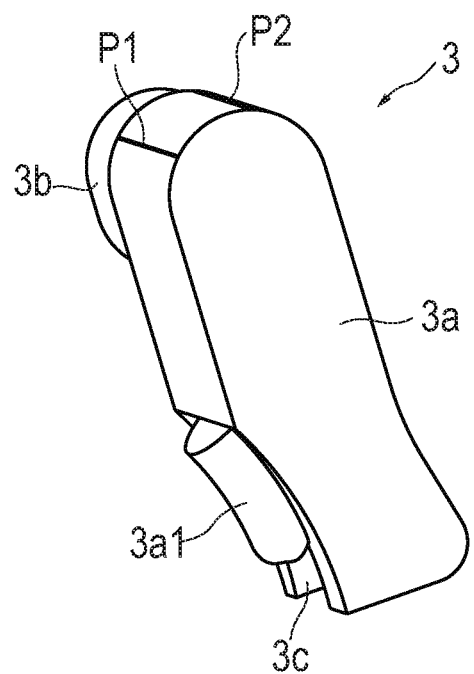
FIGS. 5A and 5B are perspective views of an end circulation component as viewed from different angles.
Figure 5B:
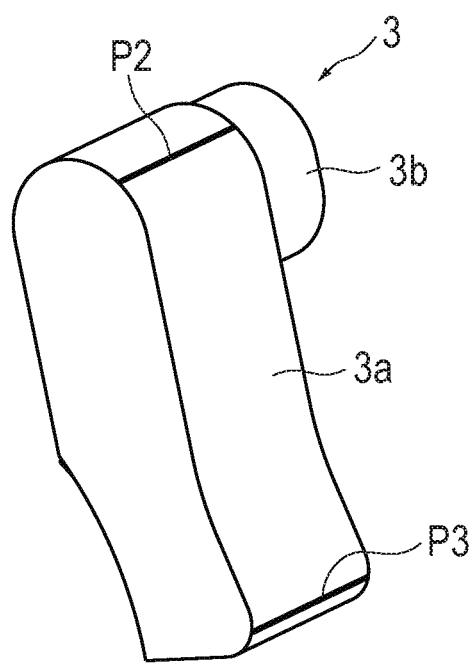

FIGS. 5A and 5B illustrate perspective views of the end circulation component 3 as viewed from different angles. The end circulation component 3 has a substantially reversed L-shape and includes a substantially cuboid main body portion 3a that is long in one direction, and a substantially cylindrical coupling portion 3b that protrudes in an orthogonal direction from one end portion of the main body portion 3a. A circulation path 3c connecting the return path 7 and the ball rolling groove 2a is formed in the end circulation component 3. A scooping portion 3a1 that scoops the ball 9 rolling along the ball rolling groove 2a is formed in one end portion of the main body portion 3a. The end circulation component 3 is divided into two parts along the circulation path 3c to facilitate resin molding. The end circulation component 3 divided into two parts is not coupled by bonding or the like to facilitate assembly. This is because the end circulation component 3 is designed in such a manner that the centrifugal force of the ball 9 acts only on the outer side of the end circulation component, and the inner side of the end circulation component is for supporting the ball 9 in an auxiliary manner if the ball 9 snakes. Naturally, it is also possible to couple the end circulation component 3 divided into two parts by bonding or the like.

Figure 6:
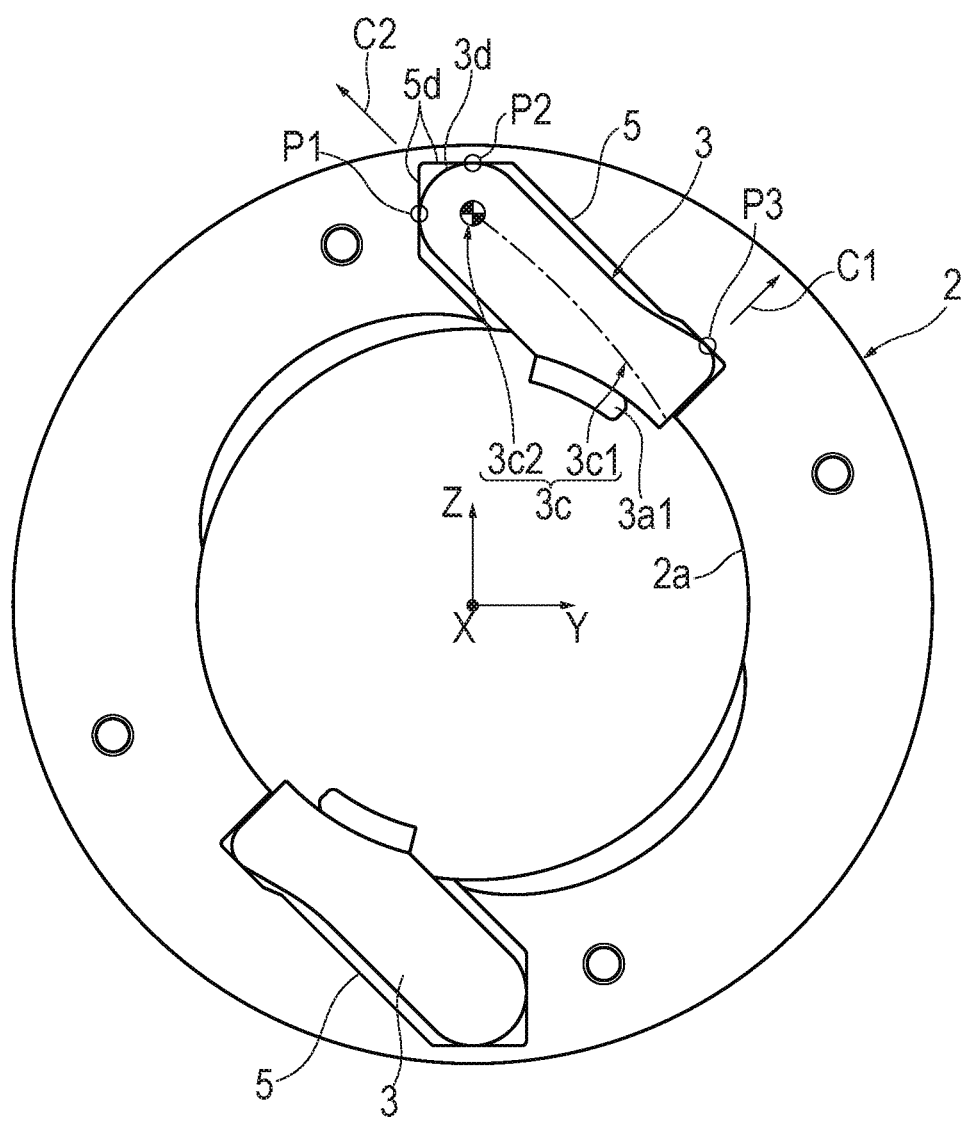
FIG. 6 is a view of the end circulation component as viewed in an axial direction.

As illustrated in FIG. 6, the end circulation component 3 is housed in the end recess 5 with clearance. There is clearance between the wall surface of the end recess 5 and the end circulation component 3. The end circulation component 3 can move in the X, Y, and Z directions in the end recess 5. In other words, the end circulation component 3 is housed in the end recess 5 in a state where there is play, without being fixed by fastening means such as a screw or bonding. The state where there is play indicates that the end circulation component 3 has play in a state where there are no balls 9 in the end circulation component 3. When the balls 9 are put in the end circulation component 3, the pushing force caused by the balls 9 adjacent in the front-and-back direction restrains the position of the end circulation component 3 to some extent.

As illustrated in FIG. 3, the end circulation component 3 is blocked by a ring- and plate-shaped lid member 8. The lid member 8 is fixed to an end surface 2b of the nut 2 by fastening means such as a screw 11 or bonding. Even if the lid member 8 is fixed to the nut 2, there is clearance in the X-axis direction between the end circulation component 3 and the lid member 8, and the end circulation component 3 can move in the X-axis direction. An end surface 3a2 of the main body portion 3a of the end circulation component 3 has a flat shape. An opposing surface 8a of the lid member 8 also has a flat shape.

As illustrated in FIG. 6, the circulation path 3c includes a ball rolling groove-side passage 3c1 and a return path-side passage 3c2. FIG. 6 illustrates the center line of these passages 3c1 and 3c2. The ball rolling groove-side passage 3c1 has a curved shape that causes a centrifugal force C1 pointing outward in the radial direction of the nut 2 to act on the ball 9, specifically a convex shape that curves outward in the radial direction. The curvature of the ball rolling groove-side passage 3c1 of the embodiment changes continuously. The curvature of one end portion of the ball rolling groove-side passage 3c1 is equal to the curvature of the ball rolling groove 2a, and is continuously reduced with increasing distance from the ball rolling groove 2a. Instead of the curved ball rolling groove-side passage 3c1, a linear ball rolling groove-side passage that scoops the ball 9 in a tangential direction of the ball rolling groove 2a can also be used. Also in this case, the centrifugal force C1 pointing outward in the radial direction of the nut 2 acts on the ball 9 immediately after exiting from the ball rolling groove 2a.

The return path-side passage 3c2 has an arc shape (an arc shape pointing from the paper surface of FIG. 6 toward a depth direction orthogonal to the paper surface), and causes a centrifugal force C2 in the substantially tangential direction of the ball rolling groove 2a to act on the ball 9.

When the centrifugal forces C1 and C2 act on the ball 9 moving along the circulation path 3c, the end circulation component 3 comes into contact with the end recess 5 at three points P1 to P3 apart from each other as viewed in the axial direction. FIG. 4 illustrates the contact points P1 to P3 on the wall surface of the end recess 5 in thick solid lines. FIG. 4 illustrates the contact points P1 to P3 of the end circulation component 3 in thick solid lines. The end circulation component 3 and the end recess 5 come into line or point contact with each other at the three points P1 to P3.

As illustrated in FIG. 6, two points P1 and P2 of the line contacts at the three points restrain the position of the end circulation component 3 in the Y- and Z-axis directions. The remaining one point P3 restrains the rotation of the end circulation component 3 about the X-axis. In other words, the line contacts at the three points P1 to P3 restrain two degrees of freedom in the position and one degree of freedom in the rotation of the end circulation component 3.

Moreover, when the centrifugal forces act on the ball 9, the end surface 3a2 of the end circulation component 3 in the axial direction comes into surface contact with the lid member 8. The surface contact restrains the position of the end circulation component 3 in the X-axis direction and also restrains the rotation of the end circulation component 3 about the Z-axis and about the Y-axis. In other words, the surface contact restrains one degree of freedom in the position and two degrees of freedom in the rotation of the end circulation component 3. The result is that the line contacts at the three points and the surface contact at one point restrain six degrees of freedom of the end circulation component 3.

The line contacts at the three points are divided into one point P1 and two points P2 and P3 across the center line of the circulation path 3c. Moreover, the line contacts at the three points are divided into one point P3 near the scooping portion 3a1 of the end circulation component 3 and two points P1 and P2 near the return path 7. The two points P1 and P2 are placed astride the centrifugal force direction, and the one point P3 is placed away from the two points P1 and P2. Accordingly, the restraint of the end circulation component 3 can be stabilized.

An arc portion 3d that is concentric with the return path 7 is formed on the end circulation component 3. The arc portion 3d comes into line contact at the two points P1 and P2 with two flat surfaces 5d, which form an L or V shape, of the end recess 5. Consequently, even if the end circulation component 3 rotates, the center of the circulation path 3c of the end circulation component 3 can be aligned with the center of the return path 7.

As described above, even if the ball 9 is not circulated, when the balls 9 are put in the end circulation component 3, the pushing force caused by the balls 9 adjacent in the front-and-back direction restrains the position of the end circulation component 3 to some extent. Moreover, the end circulation component 3 is brought into point contact with the end recess 5 at two points apart in the axial direction, instead of being brought into line contact, the same restraint can be imposed.

Figure 7A:
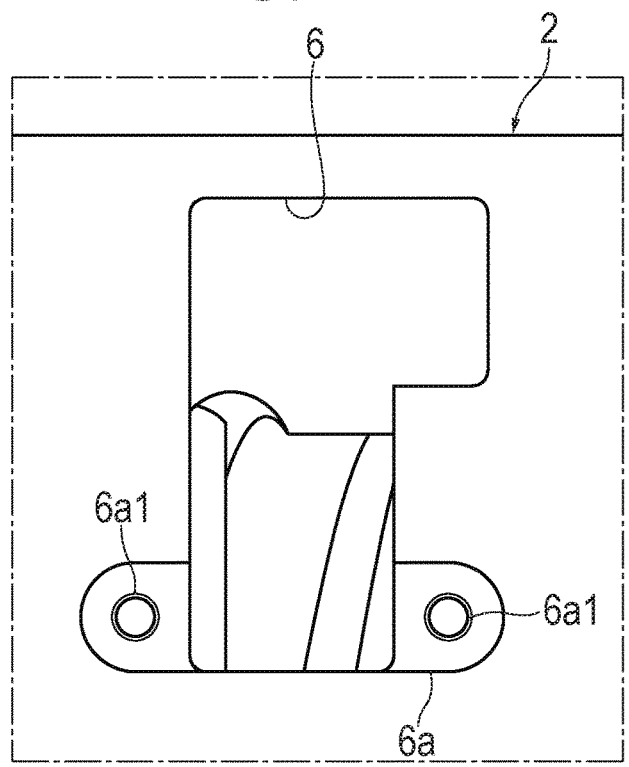
FIG. 7A is a side view of a middle recess.
Figure 7B:
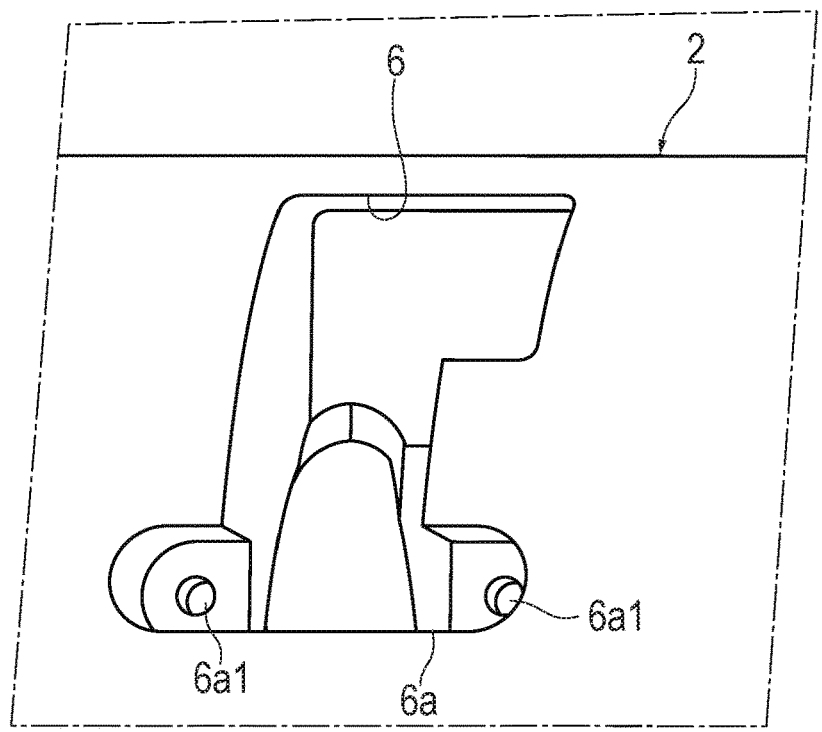
FIG. 7B is a perspective view of the middle recess.

The configuration of the middle circulation component 4 is as follows: As illustrated in FIG. 2, the middle recess 6 is formed in the outer peripheral surface of the nut 2; As illustrated in FIG. 7A, the side surface shape of the middle recess 6 has a substantially reversed L-shape that matches the side surface shape of the middle circulation component 4; and The middle recess 6 communicates with the return path 7 and the ball rolling groove 2a.

A lid housing recess 6a that is long in the axial direction is formed at one end portion of the middle recess 6. A screw hole 6a1 for mounting a lid member 12 is formed in a bottom surface of the lid housing recess 6a.

Figure 8A:
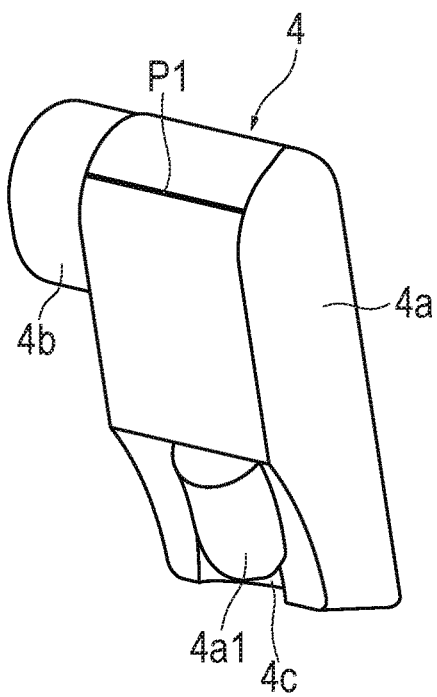
FIGS. 8A and 8B are perspective views of a middle circulation component as viewed from different angles.
Figure 8B:
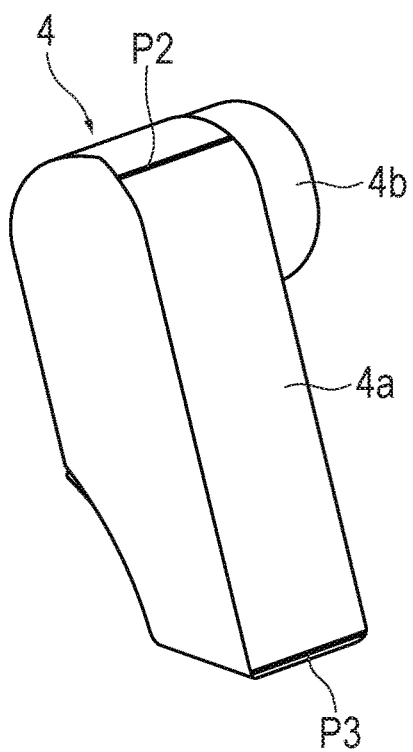

As illustrated in FIG. 8, the substantially reversed L-shaped middle circulation component 4 includes a substantially cuboid main body portion 4a that is long in one direction, and a substantially cylindrical coupling portion 4b that protrudes in an orthogonal direction from the main body portion 4a. A circulation path 4c connecting the return path 7 and the ball rolling groove 2a is formed in the middle circulation component 4. A scooping portion 4a1 is formed in one end portion of the main body portion 4a. In order to facilitate resin molding, the middle circulation component 4 is divided into two parts along the circulation path 4c, and is not coupled by bonding or the like. The reason why the middle circulation component 4 divided into two parts is not coupled is the same as the reason for the end circulation component 3.

Figure 9:
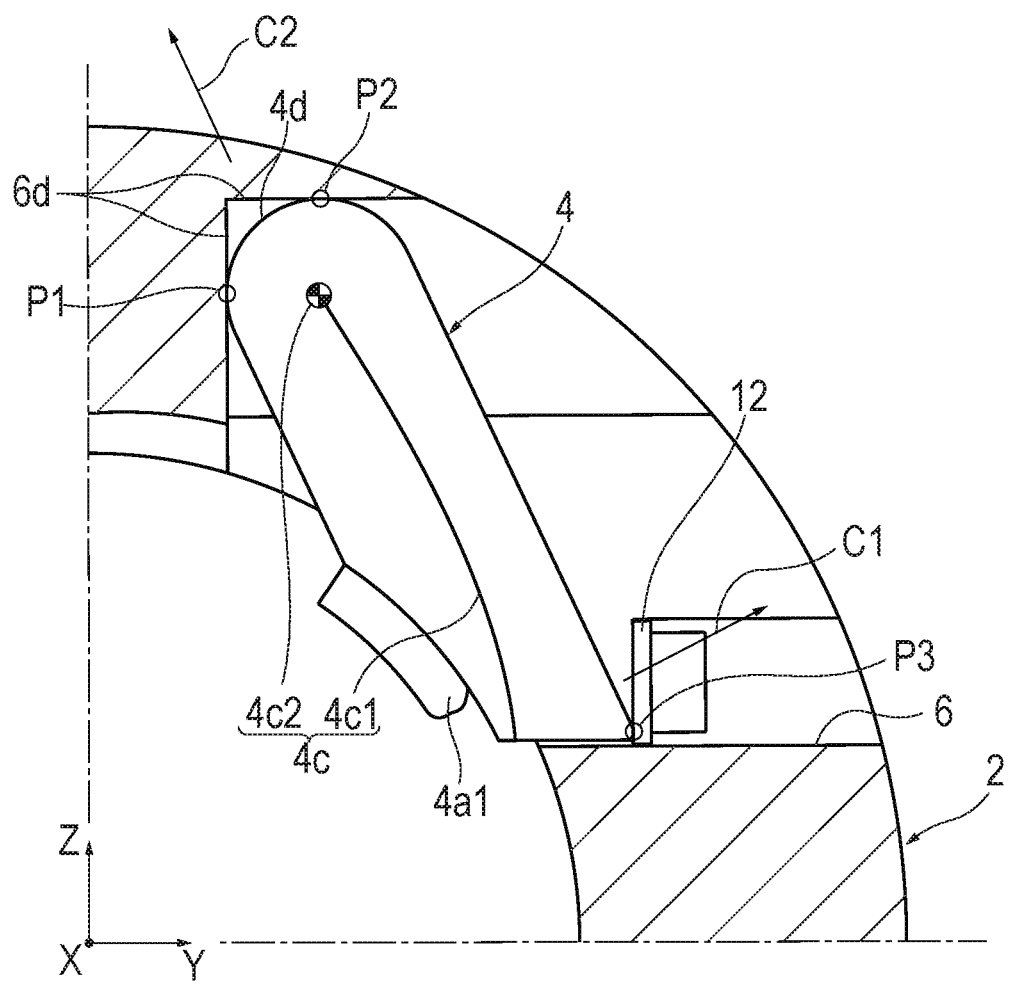
FIG. 9 is a view of the middle circulation component as viewed in the axial direction.

As illustrated in FIG. 9, the middle circulation component 4 is housed in the middle recess 6 with clearance. There is clearance between a wall surface of the middle recess 6 and the middle circulation component 4. The middle circulation component 4 can move in the X, Y, and Z directions in the middle recess 6. In other words, the middle circulation component 4 is housed in the middle recess 6 in a state where there is play, without being fixed by fastening means such as a screw or bonding. The state where there is play indicates that the middle circulation component 4 has play in a state where there are no balls 9.

Figure 10:
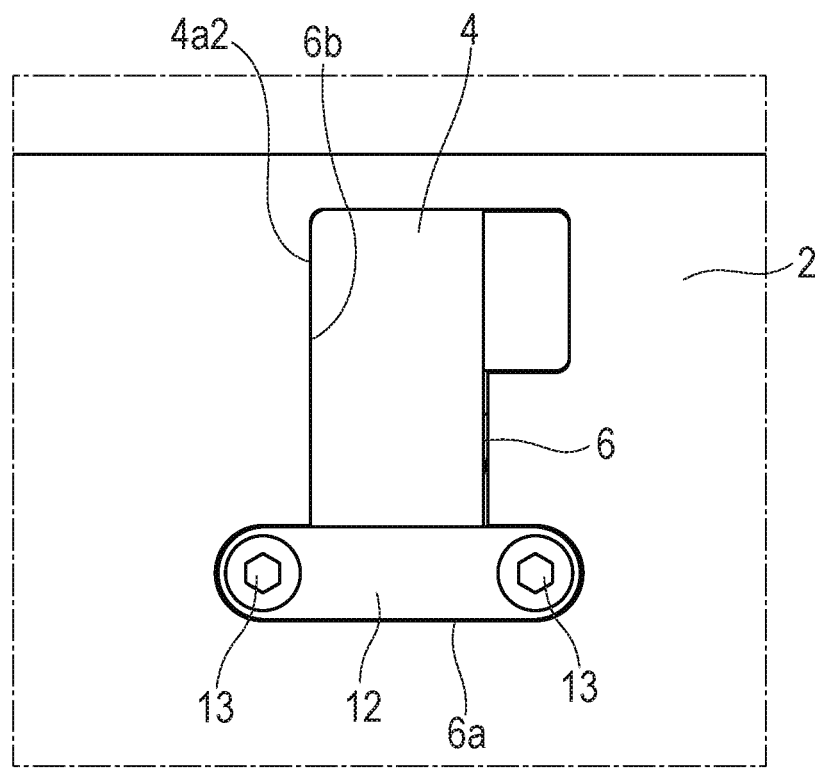
FIG. 10 is a side view of the middle circulation component.

As illustrated in FIG. 10, the linear plate-shaped lid member 12 is fitted into the lid housing recess 6a, and is fixed to the lid housing recess 6a by fastening means such as a screw 13 or bonding. The lid member 12 blocks part of the middle circulation component 4. Even if the lid member 12 is fixed to the lid housing recess 6a, the middle circulation component 4 can move in the X, Y, and Z directions in the middle recess 6.

As illustrated in FIG. 9, the circulation path 4c includes a ball rolling groove-side passage 4c1 and a return path-side passage 4c2. FIG. 9 illustrates the center line of these passages 4c1 and 4c2. The shape of the circulation path 4c of the middle circulation component 4 is the same as the shape of the circulation path 3c of the end circulation component 3. The ball rolling groove-side passage 4c1 has a curved shape that causes the centrifugal force C1 pointing outward in the radial direction of the nut 2 to act on the ball 9. The return path-side passage 4c2 has an arc shape (an arc shape pointing from the paper surface of FIG. 9 toward a depth direction orthogonal to the paper surface), and causes the centrifugal force C2 pointing in the substantially tangential direction of the ball rolling groove 2a to act on the ball 9. The shape of the circulation path 4c of the middle circulation component 4 is made the same as the shape of the circulation path 3c of the end circulation component 3. Accordingly, the processing of the middle recess 6 of the nut 2 becomes easier than before, and further the same circulation path can be taken. Accordingly, the ball 9 moves smoothly.

When the centrifugal forces C1 and C2 act on the ball 9 moving along the circulation path 4c, the middle circulation component 4 comes into line contact with the middle recess 6 at two points P1 and P2 and comes into line contact with the lid member 12 at one point P3, as viewed in the axial direction. FIG. 8 illustrates the contact points P1 to P3 of the middle circulation component 4 in thick solid lines.

Two points P1 and P2 of the line contacts at the three points restrain the position of the middle circulation component 4 in the Y- and Z-axis directions. The remaining one point P3 restrains the rotation of the middle circulation component 4 about the X-axis.

Moreover, as illustrated in FIG. 10, when the centrifugal forces act on the ball 9, an end surface 4a2 of the middle circulation component 4 in the axial direction comes into surface contact with an end wall 6b of the middle recess 6 in the axial direction. The surface contact restrains the position of the middle circulation component 4 in the X-axis direction and also restrains the rotation of the middle circulation component 4 about the Z-axis and about the Y-axis. The line contacts at the three points and the surface contact at the one point restrain six degrees of freedom of the middle circulation component 4.

As illustrated in FIG. 9, the line contacts at the three points are divided into one point P1 and two points P2 and P3 across the center line of the circulation path 4c. Moreover, the line contacts at the three points are divided into one point P3 near the scooping portion 4a1 of the middle circulation component 4 and two points P1 and P2 near the return path 7.

An arc portion 4d that is concentric with the return path 7 is formed on the middle circulation component 4. The arc portion 4d comes into line contact at two points with two flat surfaces 6d (the wall surface and the bottom surface), which form an L or V shape, of the middle recess 6.

Figure 11:
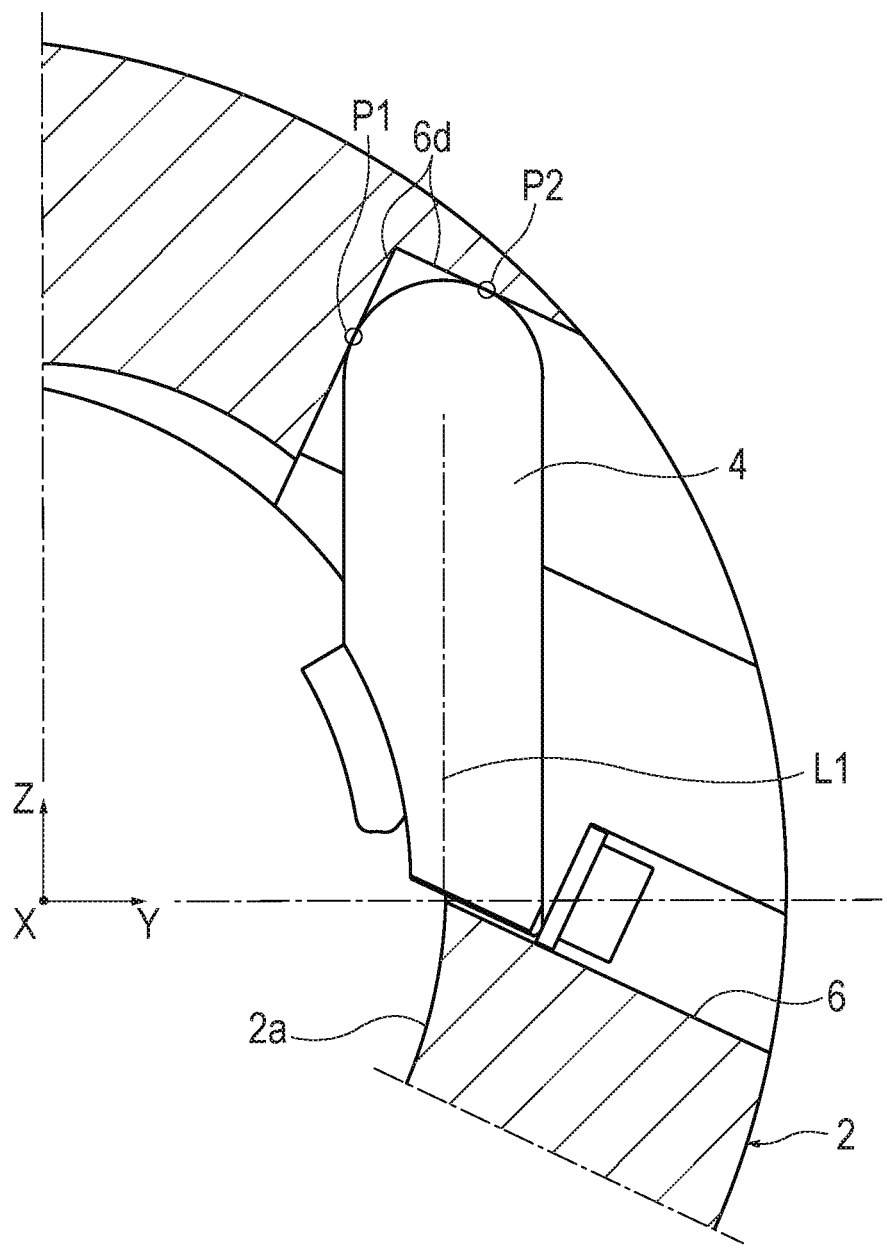
FIG. 11 is a cross-sectional view illustrating a direction where a middle recess is formed.

As illustrated in FIG. 11, assume that as viewed in the axial direction, a tangential direction L1 at a boundary between the ball rolling groove 2a of the nut 2 and the circulation path 4c of the middle circulation component 4 is oriented in the up-and-down direction, and the middle circulation component 4 is placed above the horizontal direction. The middle recess 6 is formed from diagonally below the nut 2. Consequently, the depth of the hole can be reduced as compared to a case where the middle recess 6 is formed from the tangential direction L1. Moreover, the contact points P1 and P2 of the two flat surfaces 6d of the middle recess 6 can be placed astride the centrifugal force direction.

Second Embodiment

Figure 12:
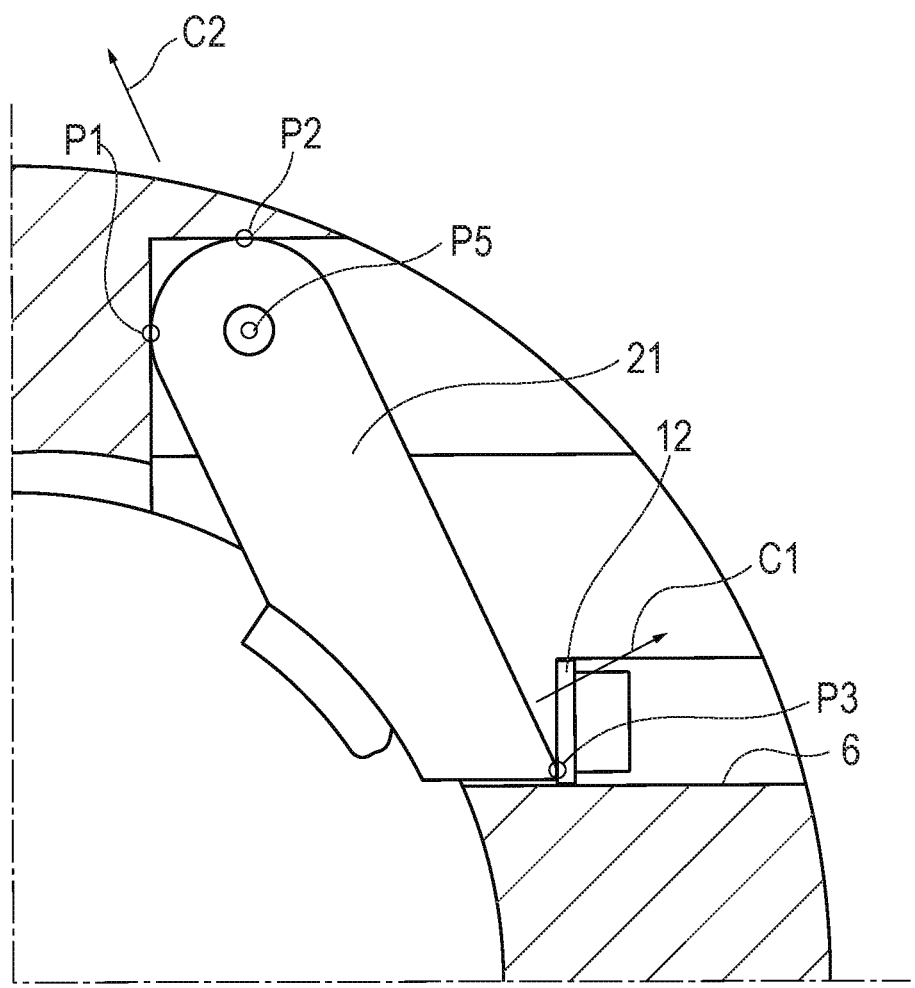
FIG. 12 is a view of a middle circulation component of a second embodiment of the present invention as viewed in an axial direction.

FIG. 12 illustrates a middle circulation component 21 of a second embodiment of the present invention. Also in the second embodiment, as viewed in the axial direction, the middle circulation component 21 comes into contact with the middle recess 6 at two points P1 and P2 and comes into contact with the lid member 12 at one point P3. However, in the embodiment, the middle circulation component 21 does not come into line contact with the middle recess 6, but comes into point contact at the two points P1 and P2 apart in the axial direction, and comes into point contact with the lid member 12 at the one point P3.

Figure 13A:
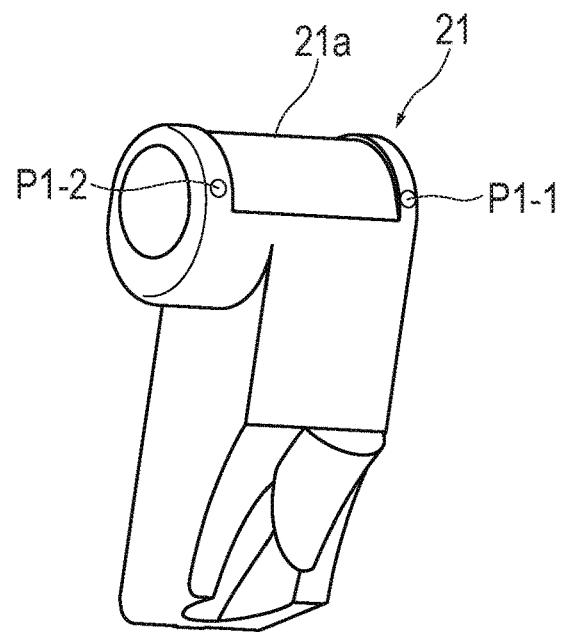
FIGS. 13A and 13B are perspective views of the middle circulation component as viewed from different angles.
Figure 13B:
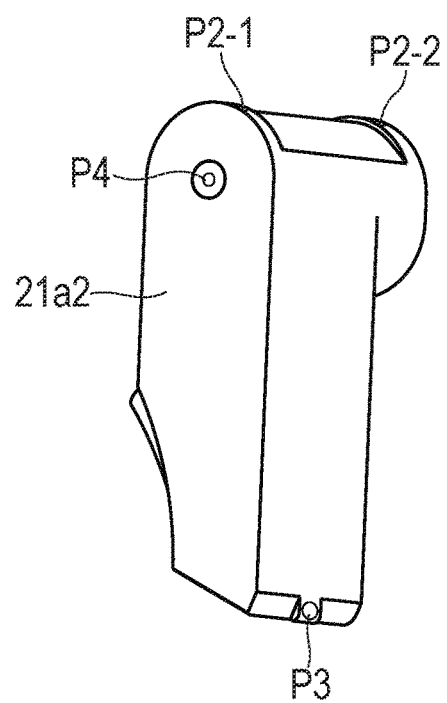

FIGS. 13A and 13B illustrate perspective views of the middle circulation component 21 as viewed from different angles. A groove 21a is formed on an arc portion of the middle circulation component 21. The middle circulation component 21 comes into point contact with the middle recess 6 at four points P1-1, P1-2, P2-1, and P2-2. The middle circulation component 21 comes into point contact with the lid member 12 at the one point P3. Moreover, an end surface 21a2 of the middle circulation component 21 in the axial direction comes into point contact at one point P4 with the end wall 6b (refer to FIG. 10) of the middle recess 6 in the axial direction.

Even if as in the second embodiment, the middle circulation component 21 is configured in such a manner as to come into point contact at six points with the middle recess 6 and the lid member 12, six degrees of freedom of the middle circulation component 21 can be restrained.

Third Embodiment

Figure 14:
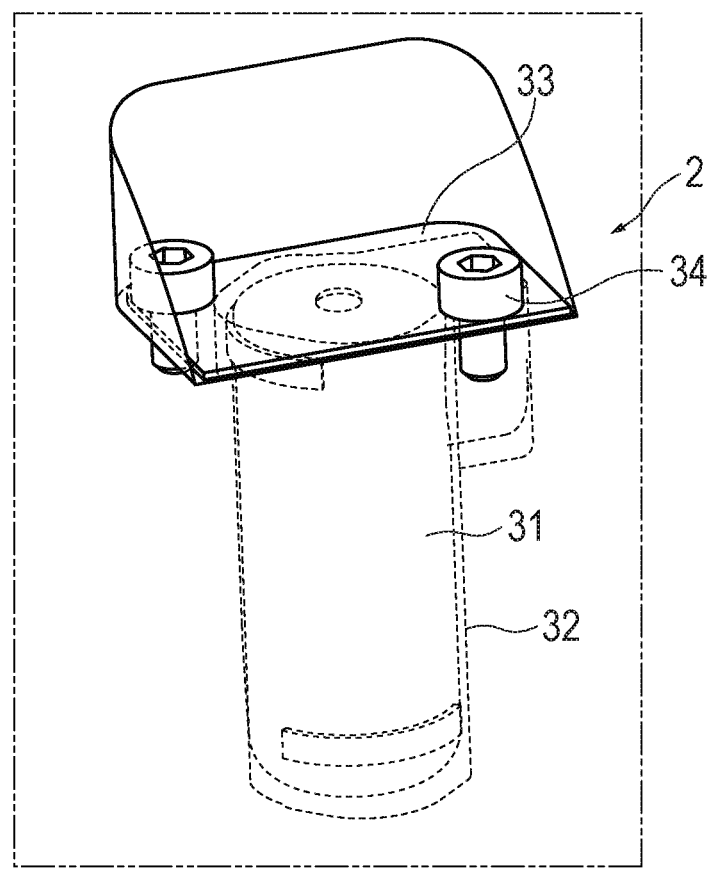
FIG. 14 is a perspective view of a middle circulation component of a third embodiment of the present invention.
Figure 15:
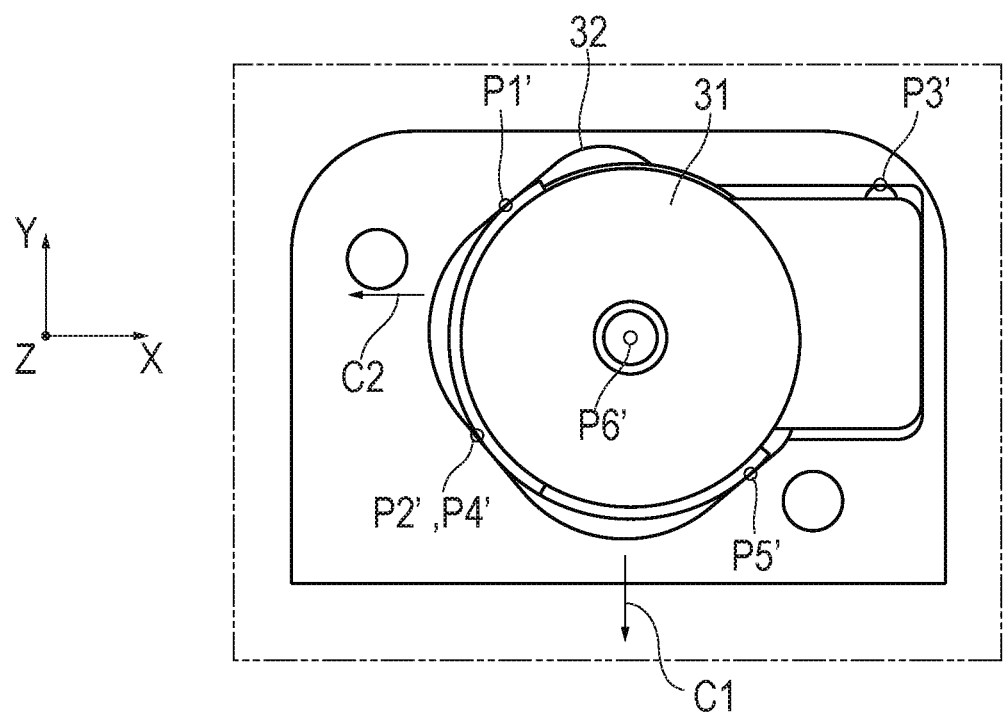
FIG. 15 is a view of the middle circulation component as viewed in an insertion direction.

FIG. 14 illustrates a middle circulation component 31 in a third embodiment of the present invention. In the third embodiment, a middle recess 32 is formed deep in a tangential direction of the ball rolling groove 2a of the nut 2. As illustrated in FIG. 15, the middle circulation component 31 is housed in the middle recess 32 with clearance. As illustrated in FIG. 14, the middle circulation component 31 is blocked by a plate-shaped lid member 33 fixed to a bearing surface on an outer peripheral surface of the nut 2 by fastening means such as a screw 34.

Figure 16A:
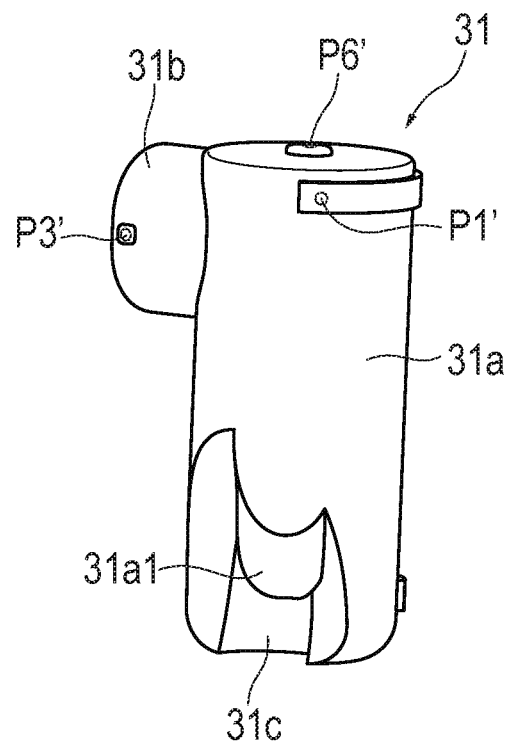
FIGS. 16A and 16B are perspective views of the middle circulation component as viewed from different angles.
Figure 16B:
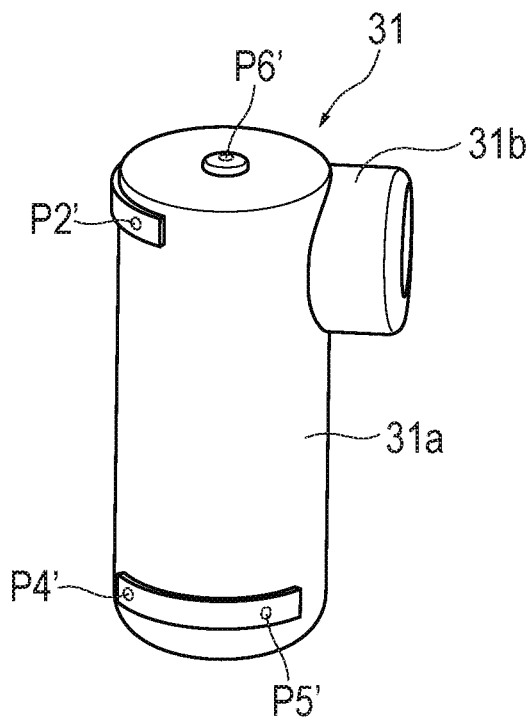

FIGS. 16A and 16B illustrate perspective views of the middle circulation component 31 as viewed from different angles. The middle circulation component 31 as a whole has a substantially reversed L-shape and includes a cylindrical main body portion 31a, and a cylindrical coupling portion 31b that protrudes in such a manner as to be orthogonal to one end portion of the main body portion 31a in the axial direction.

A circulation path 31c connecting the return path 7 and the ball rolling groove 2a is formed in the middle circulation component 31. A scooping portion 31a1 is formed in one end portion of the main body portion 31a. In order to facilitate resin molding, the middle circulation component 31 is divided into two parts along the circulation path 31c, and is integrally coupled by coupling means such as bonding.

As illustrated in FIG. 15, the circulation path 31c has a curved shape that causes the centrifugal force C1 in the radial direction to act on a scooped ball 9 and causes the centrifugal force C2 in the axial direction to act on the ball 9 moving toward the return path 7.

When the centrifugal forces C1 and C2 act on the ball 9 moving along the circulation path 31c, the middle circulation component 31 comes into point contact with the middle recess 32 at five points P1' to P5' apart from each other. FIGS. 16A and 16B illustrate the point contacts at the five points P1' to P5' on the middle circulation component 31.

As viewed in an insertion direction illustrated in FIG. 15, P2' coincides with P4'. Accordingly, the number of contact points is four as viewed in the insertion direction. The four points are divided into two points P1' and P3' and two points P2' (P4') and P5' across a virtual center line of the circulation path 31c.

The middle circulation component 31 comes into point contact with the lid member 33 at one point P6' (refer to FIG.

16). The middle circulation component 31 is configured in such a manner as to come into point contact with the middle recess 32 and the lid member 33 at six points in total. Six degrees of freedom of the middle circulation component 31 is restrained.

The present invention is not limited to realization of the embodiments, and can be realized in various embodiments within the scope that does not change the gist of the present invention.

In the embodiments, a combination of the end circulation component and the middle circulation component is used. However, a combination of the end circulation components and a combination of the middle circulation components can also be used.

In the embodiments, the ball is used as a rolling element, but a roller can also be used.

The description is based on JP 2017-031781 A filed on Feb. 23, 2017, the entire contents of which are incorporated herein.

REFERENCE SIGNS LIST

1 Screw shaft
1a Ball rolling groove (rolling element rolling groove)
2 Nut
2a Ball rolling groove (rolling element rolling groove)
3 End circulation component (circulation component)
3a1 Scooping portion
3c Circulation path
3d Arc portion
4 Middle circulation component (circulation component)
4a1 Scooping portion
4c Circulation path
4d Arc portion
5 End recess (recess)
5d Two flat surfaces
6 Middle recess (recess)
6d Two flat surfaces
7 Return path
8 Lid member
9 Ball (rolling element)
11 Screw (fastening means)
12 Lid member
21 Middle circulation component (circulation component)
31 Middle circulation component (circulation component)
31a1 Scooping portion
31c Circulation path
32 Middle recess
33 Lid member
C1, C2 Centrifugal force
P1 to P3 Three contact points as viewed in an axial direction
P1' to P5' Four contact points as viewed in an insertion direction

The invention claimed is:

1. A screw device comprising:
a screw shaft including a helical rolling element rolling groove;
a nut including a helical rolling element rolling groove opposing the rolling element rolling groove of the screw shaft, and a return path including a hole extending in an axial direction; and
a circulation component including a circulation path connecting the rolling element rolling groove of the nut and the return path of the nut, wherein,
a recess which communicates with the rolling element rolling groove of the nut and the return path of the nut is formed in the nut,
the circulation component is movably housed in the recess of the nut with clearance without being fixed to the nut by fastening means,
at least part of the circulation component is covered by a lid member fixed to the nut by fastening means, and
upon a centrifugal force acting on a rolling element moving along the circulation path, the circulation component comes into contact at at least three points at the same time with the recess, or the recess and the lid member, as viewed in the axial direction or as viewed in an insertion direction of the circulation component.

2. The screw device according to claim 1, wherein the circulation component comes into contact at three points with the recess, or the recess and the lid member, as viewed in the axial direction.

3. The screw device according to claim 2, wherein the contact is line contact.

4. The screw device according to claim 2, wherein the three points are divided into one point and two points across a center line of the circulation path as viewed in the axial direction.

5. The screw device according to claim 4, wherein the three points are divided into one point nearer a scooping portion than the return path of the circulation component and two points nearer the return path than the scooping portion as viewed in the axial direction.

6. The screw device according to claim 5, wherein
the circulation component includes an arc portion that is concentric with the return path, and
the arc portion comes into contact at two points with two flat surfaces, which form an L or V shape, of the recess.

7. The screw device according to claim 1, wherein,
the recess is an end recess formed in an end surface of the nut in the axial direction or a middle recess formed in an outer peripheral surface of the nut,
the circulation component is an end circulation component housed in the end recess or a middle circulation component housed in the middle recess, and
the circulation path of the end circulation component is the same in shape as the circulation path of the middle circulation component.

8. The screw device according to claim 1, wherein the circulation component comes into contact at at least three points with the recess as viewed in the insertion direction of the circulation component.

9. The screw device according to claim 8, wherein the circulation component comes into contact with the recess at five points in total.

10. The screw device according to claim 3, wherein the three points are divided into one point and two points across a center line of the circulation path as viewed in the axial direction.

11. The screw device according to claim 2, wherein,
the recess is an end recess formed in an end surface of the nut in the axial direction or a middle recess formed in an outer peripheral surface of the nut,
the circulation component is an end circulation component housed in the end recess or a middle circulation component housed in the middle recess, and
the circulation path of the end circulation component is the same in shape as the circulation path of the middle circulation component.

12. The screw device according to claim 3, wherein,
the recess is an end recess formed in an end surface of the nut in the axial direction or a middle recess formed in an outer peripheral surface of the nut, the circulation component is an end circulation component housed in the end recess or a middle circulation component housed in the middle recess, and the circulation path of the end circulation component is the same in shape as the circulation path of the middle circulation component.

13. The screw device according to claim 4, wherein, the recess is an end recess formed in an end surface of the nut in the axial direction or a middle recess formed in an outer peripheral surface of the nut, the circulation component is an end circulation component housed in the end recess or a middle circulation component housed in the middle recess, and the circulation path of the end circulation component is the same in shape as the circulation path of the middle circulation component.

14. The screw device according to claim 5, wherein, the recess is an end recess formed in an end surface of the nut in the axial direction or a middle recess formed in an outer peripheral surface of the nut, the circulation component is an end circulation component housed in the end recess or a middle circulation component housed in the middle recess, and the circulation path of the end circulation component is the same in shape as the circulation path of the middle circulation component.

15. The screw device according to claim 6, wherein, the recess is an end recess formed in an end surface of the nut in the axial direction or a middle recess formed in an outer peripheral surface of the nut, the circulation component is an end circulation component housed in the end recess or a middle circulation component housed in the middle recess, and the circulation path of the end circulation component is the same in shape as the circulation path of the middle circulation component.

16. The screw device according to claim 10, wherein, the recess is an end recess formed in an end surface of the nut in the axial direction or a middle recess formed in an outer peripheral surface of the nut, the circulation component is an end circulation component housed in the end recess or a middle circulation component housed in the middle recess, and the circulation path of the end circulation component is the same in shape as the circulation path of the middle circulation component.

* * * * *